United States Patent
Dennis et al.

(10) Patent No.: US 6,671,889 B2
(45) Date of Patent: Jan. 6, 2004

(54) MULTI-LAYER, PERSONNEL-PROTECTIVE HELMET SHELL WITH SPRAY-FABRICATED INNER AND OUTER STRUCTURAL LAYERS

(76) Inventors: Michael R. Dennis, 50900 W. Dike Rd., Scappoose, OR (US) 97056; Russell A. Monk, 220 Culver La. South, Salem, OR (US) 97302

(*) Notice: Subject to any disclaimer, the term of this patent is extended or adjusted under 35 U.S.C. 154(b) by 0 days.

(21) Appl. No.: 10/435,950

(22) Filed: May 12, 2003

(65) Prior Publication Data

US 2003/0200597 A1 Oct. 30, 2003

Related U.S. Application Data

(62) Division of application No. 10/003,742, filed on Nov. 14, 2001.

(51) Int. Cl.[7] .................................................. A42B 3/00
(52) U.S. Cl. ............................................. 2/411; 2/412
(58) Field of Search ........................... 2/410, 411, 412, 2/414

(56) References Cited

U.S. PATENT DOCUMENTS

| | | |
|---|---|---|
| 2,140,716 A | 12/1938 | Pryale |
| 2,378,642 A | 6/1945 | Kopplin |
| 3,018,210 A | 1/1962 | Frieder et al. |
| 3,444,288 A | 5/1969 | Mead |
| 3,501,772 A | 3/1970 | Wyckoff |
| 3,770,483 A | 11/1973 | Komine |
| 3,935,044 A | 1/1976 | Daly |
| 3,946,441 A | 3/1976 | Johnson |
| 4,008,949 A * | 2/1977 | Luna ............................. 2/410 |
| 4,020,507 A | 5/1977 | Morton |
| 4,075,717 A * | 2/1978 | Lemelson ...................... 2/412 |
| 4,136,226 A | 1/1979 | Gilman |
| 4,279,038 A | 7/1981 | Bruckner et al. |
| 4,845,786 A | 7/1989 | Chiarella |
| 4,874,640 A | 10/1989 | Donzis |
| 4,993,076 A | 2/1991 | Dierickx |
| 5,177,815 A | 1/1993 | Andujar |
| 5,424,021 A | 6/1995 | Nakade et al. |
| 5,713,082 A | 2/1998 | Bassette et al. |
| 5,790,988 A | 8/1998 | Guadagnino, Jr. et al. |
| 6,108,825 A | 8/2000 | Bell et al. |
| 6,374,422 B1 | 4/2002 | Gonzalez et al. |
| 6,425,141 B1 | 7/2002 | Ewing et al. |
| 6,446,270 B1 | 9/2002 | Durr |
| 6,467,099 B2 | 10/2002 | Dennis et al. |
| 6,536,052 B2 * | 3/2003 | Tao et al. ...................... 2/411 |

* cited by examiner

Primary Examiner—Rodney M. Lindsey
(74) Attorney, Agent, or Firm—Jon M. Dickinson, P.C.; Robert D. Varitz, P.C.

(57) ABSTRACT

A multilayer helmet shell wherein inner and outer, structural, load-bearing semi-rigid layers, each formed from an affinity-bonded agglomeration of mechanically interactive, spray-deposited particles, jacket a viscoelastic, acceleration-rate-sensitive, microcellular foam core layer. The mechanical interfaces between the inner and outer jacketing, and the intermediate core, materials take the form of regions of inter-material suffusement.

8 Claims, 1 Drawing Sheet

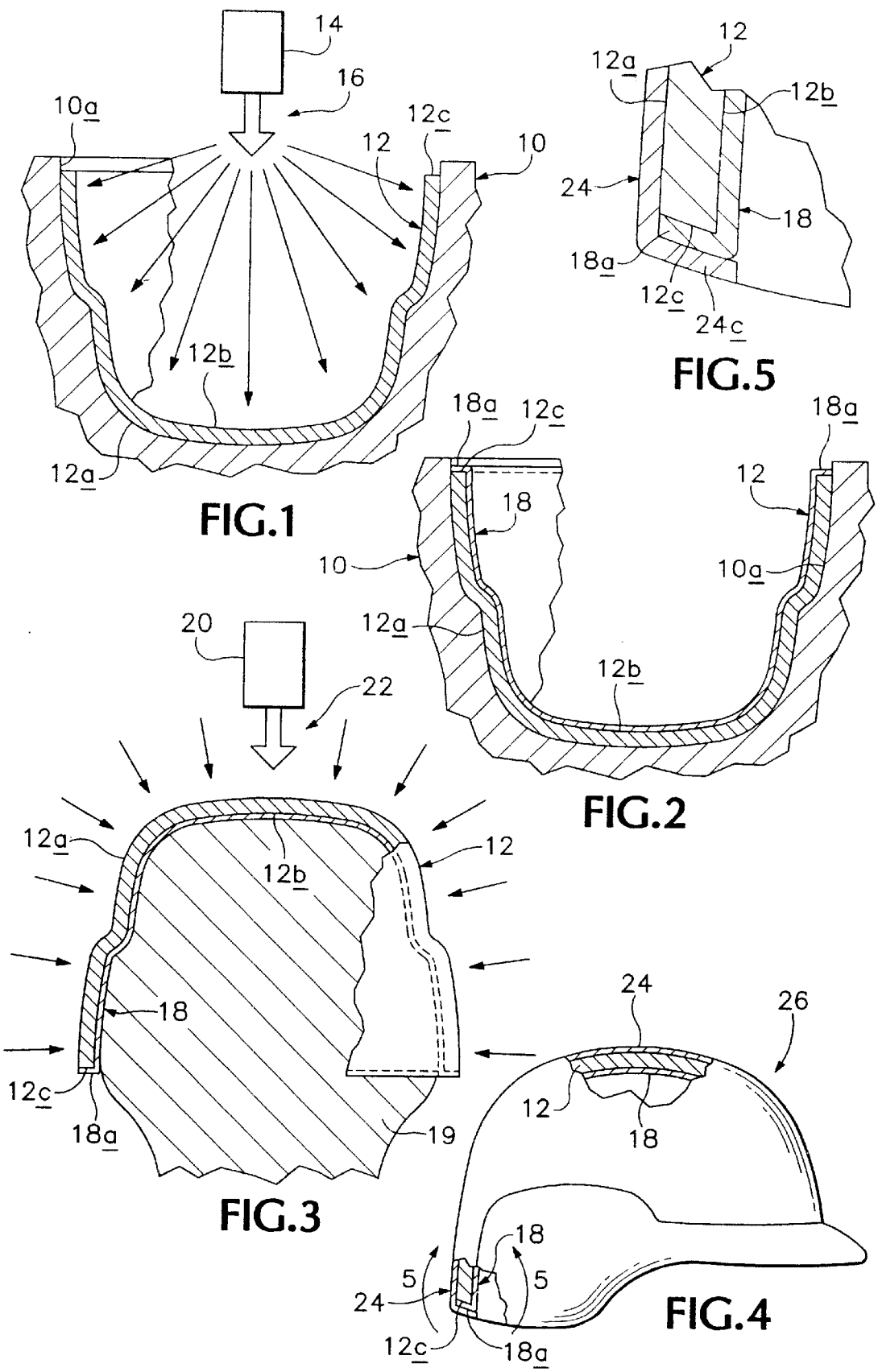

MULTI-LAYER, PERSONNEL-PROTECTIVE HELMET SHELL WITH SPRAY-FABRICATED INNER AND OUTER STRUCTURAL LAYERS

CROSS-REFERENCE TO RELATED APPLICATION

This case is a division from prior-filed U.S. patent application Ser. No. 10/003,742 filed on Nov. 14, 2001, for Multi-Layer, Personnel-Protective Helmet Shell With Spray-Fabricated Inner And Outer Structural Layers.

BACKGROUND OF THE INVENTION

The invention pertains to personnel-protective (blunt object impact and noise suppression) helmet shell construction, and in particular, to such a shell wherein inner and outer, load-bearing, semi-rigid structural layers in the shell are formed/fabricated by the process of vapor-suspension, material-spray deposition. Preferably employed for such a structural spray is a two-component, polyurea/polyurethane spray elastomer system, such as the component system known as HYDROTHANE made and sold by Hydroseal Polymers, Inc. of Riverside, Calif. The two components making up this product are isocyanate and polyol. We have discovered that this commercially available system, which is focusedly designed to create protective coatings over other objects, can itself be employed to form independent structural objects per se. This discovery opens the door to the moldless creation of many different kinds of structural objects, such as the helmet shell structure which is particularly disclosed and illustrated herein.

This spray material, appropriately prepared for spraying as a particle vapor-suspension, includes particles having a strong bonding affinity for one another upon contact. Contacting particles agglomerate after landing with one another to form, progressively, a solid, semi-rigid, load-bearing structure. The "exposed" surface of this forming structure has an infinitely and subtlety selectable and controllable topography, dictated principally by how much material is sprayed, and how the forming spray is aimed and maneuvered, during the spraying procedure.

Proposed by the invention is a novel multilayer (especially three-layer), personnel-protective helmet shell construction wherein a central (or core) layer is formed of a suitable shock-absorbing (and also sound-deadening) soft, viscoelastic, microcellular foam layer, jacketed on its inner and outer surfaces by sprayed-formed, more rigid (semi-rigid) layers of a vapor-suspension, structural deposition plastic material. As will become apparent, the invention features a structural helmet which is uniquely derived from a bonding-affinity agglomeration of structurally interactive, initially vapor-suspension particles cooperatively united via a simple, quick, precise, inexpensive and reliably repeatable manufacturing practice that offers a number of significant functional advantages, and attractive fabrication economies, in relation to conventional, molded, helmet-shell practices. The resulting helmet shell of the invention, because of the mechanically interactive cooperation that results from the spray associated agglomerated particles just mentioned, offers robust, high-level load-distribution and blunt-object-impact cushioning performance, as well as noise suppression.

The various features, objectives and appealing advantages that are offered and attained by the present invention will become more fully apparent as the description which now follows is read in conjunction with the accompanying drawings.

DESCRIPTION OF THE DRAWINGS

FIG. 1 is a simplified view illustrating one manner of practicing initial stages in the formation of a multilayer helmet shell in accordance with the present invention—such initial formation is illustrated taking place within an appropriately shaped, open, female cavity provided in a suitable external structure.

FIG. 2 is similar to FIG. 1, except that here one sees what constitutes herein a second-stage, precursor, helmet-shell result which exists after performance of the practice shown in FIG. 1.

FIG. 3 illustrates a next step in the preparation of the helmet shell of the present invention, and specifically a step which is implemented after the second-stage precursor shell pictured in FIG. 2 has been removed from the female cavity, and placed on an appropriately shaped supporting male mandrel.

FIG. 4 is a side view, partly sectioned to show details of construction, of the desired, finished helmet shell.

FIG. 5 is an enlarged, fragmentary detail of the area in FIG. 4 which is generally embraced by curved arrows 5—5.

DETAILED DESCRIPTION OF AND BEST MODE FOR CARRYING OUT THE INVENTION

Fundamentally, practice of the present invention to create the desired, multilayer helmet shell involves the spray formation, on the inner and outer surfaces of a shaped foam core layer, of inner and outer semi-rigid structural shell layers. As distinguished from conventional helmet-making practices (typically involving costly molding), no molding step is employed. The cavity and mandrel referred to above in the descriptions of the drawings are furnished as external structures that provide support and configuration shaping at different points in the preferred manner of practicing the invention.

Turning now to the drawings, in an appropriately formed, open-topped, female well, or cavity, 10a in a structure 10, a central core layer 12 of a suitable soft, pliable and compressible, viscoelastic, microcellular foam material is placed to conform generally complementarily to the shape of this well. Provision of structure 10 with its cavity 10a constitutes herein the preparing (at least partially) of an environment for the reception of a spray material. An appropriate material for core layer 12 is the viscoelastic, acceleration-rate-sensitive, noise-suppressing urethane material called PORON@, made by Rogers Corporation of Woodstock, Conn., and sold as one of the urethane products in the PORON@ 4000 Performance Urethane 90 Series line of products offered by that company. The material preferably chosen from this line exhibits a rebound characteristic lying in the range of about 5%–10% rebound, as determined in a standard ASTMD 2632-90 Vertical Rebound Resiliency Test, and most preferably possesses about 8% rebound. Also, the selected viscoelastic material exhibits an energy dissipation characteristic lying preferably in the range of about 0.5–0.9, according to a standard TAN Δ Energy 15 Dissipation Ratio Test, and most preferably about 0.7.

Preferably, this core material is initially prepared (shaped) by precision diecutting of a starter shape, or blank, from a sheet of the mentioned material. While natural shape-memory in the core material sheet will cause the die-cut blank thereof to tend to fit with its outside surface 12a snugly against the inside surface of well 10a, it is preferable to assure an initially stable, conforming fit by employing a suitable coating of any conventional light-duty, easy-release contact adhesive on the well's surface. Another appropriate manner of establishing a conforming fit is through the use of a suitable vacuum-creating system which draws the blank against the well wall. Core material 12 herein, also referred to as a first precursor helmet shell, has a preferred thickness of about ¼-inches.

With the core-layer material thus inserted in well 10a, and with shape-memory in the material, and any suitably employed temporary adhesive (or a vacuum system), causing the outside surface of the core-layer blank to lie in close conformance, flush against the inside surface of well 10a, the stage is set for the next step in the fabrication process.

With core-material blank 12 so placed in the well, from any suitable pressurized source, such as source 14, of a spray of preselected, quick setting and curing (8–10-seconds), structural, semi-rigid plastic deposition material, such as the two-component material generally mentioned earlier, a vapor-suspension particle spray 16 of this material is directed under suitable control, such as under manual or computer control, into the interior of the core-material blank. A spray-material product selected from the named HYDROTHANE system line of materials, exhibits, after formation and curing, a semi-rigidity which is characterized by a Shore hardness lying in the range of about 60 Shore A–70 Shore D, and most preferably about 90 Shore A. Spraying is carried out preferably with structure 10 and material 12 residing at normal ambient temperature and at atmospheric pressure. The mentioned particle spray material has an affinity to agglomerate and bond to itself, with freshly accumulating material curing to rigidity in the very short time frame mentioned above. Such agglomeration establishes an important structural, mechanically-cooperative interaction between bonded particles that plays, as we have learned, an appreciable role in the final desired structural behavioral characteristics of a completed helmet shell.

In the particular process now being described, source 14 includes two pressurized and pre-heated containers, one for each of the two components in the HYDROTHANE material. An appropriate container pressure for each component is about 1400-psi, and an appropriate temperature, about 120°–140° F. for the isocyanate container, and about 140°–150° F. for the polyol container. From these two containers, the two components flow in a roughly 50/50 proportion toward a mixing spray head (not shown) through independent hoses (also not shown) each heated to about 110°–120° F.

By controlling the amount of material employed during spraying, and by maneuvering the aim and location of the spray, such spraying essentially by itself determines the final topography of layer 18, given, of course, the fact that the inner surface of core layer 12 plays an initial role in defining shape and topography.

Such spraying creates a selected-thickness (herein about ¹⁄₁₆- to about ⅛-inches) coating, or layer, (see layer 18 in FIGS. 2–5, inclusive) of this spray material on the inner surface 12b in the blank. While a differentiated, distributed thickness can, if desired, easily be achieved in layer 18, for simplicity purposes herein this layer is only shown with a uniform thickness.

As was just mentioned above, the preferred sprayed-on material used for the creation of inner layer 18 effectively dries and cures to a state of stable semi-rigidity within a matter of roughly about 8- to about 10-seconds. A certain amount of this material works its way into the internal pore structure of core layer 12, just beneath surface 12b in that core material. This suffusing of spray material into the core material unites the "surface" interface between layers 12, 18 so that the united surface regions act effectively in mechanically locked unison in the finished helmet shell. Curing and rigidifying of layer 18 essentially locks the assembly of layer 12, and the newly-formed, sprayed-on layer 18, into configuration stability. As can be seen in FIGS. 2–5, inclusive, a small edge portion 18a in sprayed layer 18 extends over and covers the exposed, thin, 5 ridge-like edge 12c of core layer 12.

The combination of core layer 12 and sprayed inner layer 18 constitutes a second precursor helmet shell herein.

Next, the assembly made up of core layer 12 and inner layer 18 is removed from cavity 10a, and is fitted over an appropriately shaped male mandrel, such as mandrel 19 10 shown fragmentarily in FIG. 3. Provision of mandrel 19 is referred to herein also as a step in preparing an environment for the reception of spray material. Under these circumstances, the outside surface 12a in core material 12 is now fully exposed.

What happens next is that, from another appropriate pressurized supply, or source, 20 of another selected, structural, spray deposition material, a new vapor-suspension spray 22 is directed appropriately onto the outer surface in the core layer to form a sprayed-on outer layer 24 (see FIGS. 4 and 5). In the making of the particular helmet shell now being described, the material deposited to form outer layer 24 is the same as that which has been used to form inner layer 18, and as was true with respect to the cooperative interface that develops between layers 12, 18, a like unified interface develops between layers 18, 24. Spraying is performed in the manner just above described for the creation of layer 18. Layer 24 herein has a uniform thickness of about ¹⁄₁₆- to about ⅛-inches. Layer 24 includes an edge portion 24c which bonds unitarily to edge portion 18a in layer 18.

Application of this second spray of deposition material thus creates a second jacketing, sprayed-on, structural, semi-rigid layer which now cooperates with core layer 12 and inner layer 18 to form the final desired helmet shell. The finished shell is pictured freestanding at 26 in FIGS. 4 and 5.

It is important to note that, except for the shaped pre-presence of core layer 12, inner and outer layers 18, 24 are entirely shaped by controlled material deposition. No shape-dedicated, expensive, precision mold surfaces are required. The process for creating the helmet shell of the invention thus enables the making of a substantially infinite variety of structural shapes, free from the economic challenge of building and maintaining expensive molds. While the fabrication procedure specifically described herein begins with the use of a female external structure, and ends with the use of a male external structure, a reverse approach can also be employed. The particle-agglomeration physical structure which is present in the helmet shell of the invention appears uniquely to contribute to the desired mechanical behavior of the finished shell in terms, inter alia, of personnel protection. The suffused, cooperative, mechanical interface which results between each spray-formed structural layer and the adjacent microcellular foam material in the finished shell also appears to play an appreciable role in helmet shell desired performance.

While fabrication of the invention has been disclosed in a particular setting, and in particular forms herein, the specific embodiments disclosed, illustrated and described herein are not to be considered in a limiting sense. Applicants regard the subject matter of their invention to include all novel and non-obvious combinations and sub-combinations of the various elements, features, functions and/or properties disclosed herein. No single feature, function, element or property of the disclosed embodiments is essential. The following claims define certain combinations and sub-combinations which are regarded as useful, novel and non-obvious.

It is desired to secure and claim by Letters Patent:

1. A largely spray-formed, shock-protective, multilayer helmet shell comprising a helmet-shaped structural central layer having inner and outer surfaces, a helmet-shaped structural inner layer joined to the inner surface of said central layer, which inner layer has been formed to its final shape substantially entirely by a first vapor-suspension particle deposition material that has been sprayed onto the inner surface of said central layer to form an interactive particle agglomeration, and a helmet-shaped structural outer layer joined to the outer surface of said central layer, which outer layer has been formed to its final shape substantially entirely by a second vapor-suspension particle deposition material which has been sprayed onto the central layer's outer surface to form another interactive particle agglomeration.

2. The helmet shell of claim 1, wherein said central layer is formed of a soft, pliable, microcellular, viscoelastic foam material, and said inner and outer layers, in their final conditions, take the forms of relatively rigid jackets substantially, and collectively cooperatively, encapsulating the central layer.

3. The helmet shell of claim 2, wherein the surface interfaces between the central layer, and the inner and outer layers are characterized by unitizing mechanical bonds between the layers.

4. The helmet shell of claim 3, wherein said mechanical bonds are structurally characterized by a suffusing of inner and outer layer material with the surface structure of said central layer.

5. The helmet shell of claim 4, wherein said central layer is formed of an acceleration-rate-sensitive material.

6. The helmet shell of claim 5, wherein said acceleration-rate-sensitive material is a microcellular foam material.

7. The helmet shell of claim 1, wherein said central layer is formed of an acceleration-rate-sensitive material.

8. The helmet shell of claim 7, wherein said acceleration-rate-sensitive material is a microcellular foam material.

* * * * *